United States Patent [19]

Fitzpatrick

[11] 4,029,484

[45] June 14, 1977

[54] MIST SCRUBBING OF WASTE HALIDE EFFLUENT

[75] Inventor: Timothy Allen Fitzpatrick, Wilmington, Del.

[73] Assignee: E. I. Du Pont de Nemours and Company, Wilmington, Del.

[22] Filed: Jan. 21, 1976

[21] Appl. No.: 651,194

[52] U.S. Cl. .................................... 55/71; 55/72
[51] Int. Cl.² .................................... B01D 53/00
[58] Field of Search ................ 55/71, 72; 423/612

[56] References Cited

UNITED STATES PATENTS

| | | |
|---|---|---|
| 3,460,900 | 8/1969 | Moldovan et al. .................. 55/71 |
| 3,505,788 | 4/1970 | Teller et al. ......................... 55/71 |
| 3,564,817 | 2/1971 | Kleinfelder et al. ................ 55/71 |
| 3,690,041 | 9/1972 | Low ..................................... 55/71 |
| 3,755,990 | 9/1973 | Hardison ........................... 55/233 |

*Primary Examiner*—Bernard Nozick

[57] ABSTRACT

A process for cleansing waste halides from a waste gas stream containing waste halide impurities wherein the waste gas stream is contacted with an aqueous acid mist selected from HCl, $HNO_3$, HBr, HF, and HI, or an aqueous halide salt mist selected from halide salts of calcium, sodium, ammonium, lithium, barium, and iron, with the provisos that the temperature of the combined gas stream and aqueous mist is about −5° to 70° C., the water vapor pressure of the aqueous mist is about 0.05–5.0 mm Hg, and the ratio of surface area of the aqueous mist to the weight of waste halide is at least 2 square meters surface area of aqueous mist per gram of waste halide. Then the gas stream is separated from the acid and the gas stream is scrubbed with water.

10 Claims, No Drawings

MIST SCRUBBING OF WASTE HALIDE EFFLUENT

BACKGROUND OF THE INVENTION

This invention relates to a process for cleansing waste halides from a waste gas stream containing waste halide impurities.

The commercial production of metallic or nonmetallic halides (such as $TiCl_4$) often results in a waste gas which contains small amounts of waste halides in a gaseous state. The waste gas can be predominantly a purge gas, such as nitrogen, or it can be a mixture of other gases, such as CO, $CO_2$, $N_2$, halogen, and acid halide. Disposal of the waste gas by venting directly to the atmosphere, even after conventional scrubbing (water-dilute acid scrubbing), results in an optically dense cloud caused by hydrolysis of the small amount of waste halides present. Thus, it is aesthetically desirable to have essentially complete removal of the small amount of waste halides prior to venting the waste gas into the atmosphere.

This problem has been recognized and various techniques have been tried to eliminate plume formation in waste gas streams. One such approach is disclosed in U.S. Pat. No. 3,460,900, to Moldovan et al., which relates to a process for removing titanium tetrachloride from the gases resulting from furnaces used in the chlorination of titaniferous materials by contacting the gases with aqueous solutions of 20-33% HCl or 20-98% $H_2SO_4$ at temperatures of 5°–50° C. A disadvantage of Moldovan's process is that a gaseous stream containing $TiCl_4$ is passed through an acid solution in an undispersed phase. This is expensive and inefficient since it requires large amounts of acid. Thus, there is a need for a process which efficiently removes all waste halide impurities from a gas stream.

U.S. Pat. No. 3,564,817, to Kleinfelder et al., relates to a process for removing small amounts of titanium tetrachloride and other chloride impurities from waste gas produced during chlorination of a titaniferous ore by first acid scrubbing the gas with sulfuric acid of 75-95 weight percent concentration, scrubbing the separated gas with water, and then venting the gas from the water scrubbing apparatus to the atmosphere. A disadvantage of this process is that once the $TiCl_4$ is absorbed into the sulfuric acid titanyl sulfate forms and consumes some of the acid. Further, the remaining sulfuric acid present in solution with the titanyl sulfate cannot be recovered and reused in the process because the acid cannot be distilled out of the solution. Instead, the remaining acid must be neutralized and disposed of. Thus, there is a need for a process for removing waste halides from a waste gas stream using an aqueous acid which is not consumed when contacted with the waste halide and which can be recovered and reused in the process.

SUMMARY OF THE INVENTION

This invention relates to a process of removing waste halide vapor from a waste gas stream by contacting the waste gas stream with an aqueous absorption medium followed by the scrubbing of the waste gas stream, the improvement comprising (A) generating an absorptive aqueous mist containing water in which is dissolved HCl, $HNO_3$, HBR, HF, HI, or one or more halide salts of calcium, sodium, ammonia, lithium, barium, and iron, (B) maintaining the temperature of the combined waste gas stream and absorptive aqueous mist at a temperature of from −5° C. to 70° C., (C) maintaining the water vapor pressure of the absorptive aqueous mist at a vapor pressure of from 0.05–5.0 mm Hg prior to contact with the waste gas stream, (D) controlling the particle size of the aqueous absorptive mist so that the ratio of the surface area of the absorptive aqueous mist to the weight of the waste halide to be removed is at least 2 square meters surface area of the absorptive aqueous mist per gram of waste halide present in the gas stream, and (E) separating the gas stream from the aqueous absorptive mist.

DETAILED DESCRIPTION OF THE INVENTION

The process of the present invention is employed to cleanse waste halides (e.g., $TiCl_4$) from a waste gas stream containing waste halide impurities. As indicated earlier, the presence of even small amounts of waste halides in waste gas streams results in the formation of highly visible clouds, known as plumes, when the waste gas stream is brought into contact with the atmosphere. It is postulated that these plumes form because hydrolysis occurs when the waste halides are contacted with water vapor either through the atmosphere or by conventional scrubbing (e.g., water-dilute acid scrubbing). For example, when a $TiCl_4$-containing gas stream is vented to the atmosphere or conventionally scrubbed, it appears as dense white clouds upon exit from the stack. Formation of these clouds is aesthetically undesirable and it is in the interest of a cleaner environment that they be eliminated. The process of the present invention removes titanium tetrachloride and other waste halide impurities from waste gas streams containing these impurities with the result that the waste gas streams emitted to the atmosphere are devoid of such impurities and therefore do not appear as optically dense clouds.

By the process of the present invention, a waste gas stream containing waste halide impurities is contacted with an aqueous acid mist containing HCl, $HNO_3$, HBr, HF, and HI, or a halide salt of calcium, sodium, ammonium, lithium, barium, and iron. Mist is defined as liquid droplets of about 5000 microns or less dispersed in a gas. The mist can be produced by the use of apparatuses such as a baffle column, an orifice scrubber, a spray tower, or an atomizer. When the waste gas stream and absorptive aqueous mist are contacted, the waste halide impurities present in the waste gas stream are rapidly absorbed into the mist. Contact between the gas stream and the mist may be cocurrent or countercurrent.

The ratio between surface area of the aqueous mist and the weight of the waste halide impurities is at least 2 square meters surface area of mist per gram of waste halide impurity present in the waste gas stream. The preferred ratio is about 12–16 square meters surface area mist per gram of waste halide impurity. This range is preferred because it provides optimum contact between the waste gas stream and the mist, thereby maximizing absorption of the waste halide into the mist and minimizing hydrolysis. Although the ratio can be as high as 50, so much energy is required to attain this ratio that operation at such a high ratio is not economical. The surface area of the mist is defined as the surface area of each particle (e.g., if each particle is spherical then the surface area is $4\pi$ times the radius squared of an average sized particle) multiplied by the number of particles generated, which surface area can be easily calculated for each specific piece of equipment. The amount of halide gas in the waste gas stream can be calculated by using Raoult's Law, as described in Perry et al., *Chemical Engineers' Handbook*, McGraw Hill, New York, N.Y. (1963) pages 4–59.

After the waste halide impurities are absorbed into the mist, the gas stream is separated from the mist by passing the combined gas stream and mist through a conventional gas-liquid separator such as a conical separator. The mist containing waste halide impurities is collected as a liquid, and if the liquid contains an acid, the acid can be recovered by distillation and reused in the process of the present invention. If one does not wish to distill and reuse the acid, it can be neutralized to its corresponding salt or if the liquid contains only waste halide salts it is then disposed of.

The waste gas stream which has been cleansed of waste halide impurities is then scrubbed with water to remove vaporous halide acid which is formed during the production of the waste halide. The halide acid present will be the acid of the halide waste being produced (e.g., if a metal chloride is being produced, then the acid produced is HCl). The vaporous halide acid is removed because of its corrosive nature. The halide acid collected in aqueous form can then be used in the process of the present invention. Then the remaining waste gas stream, composed predominantly of inert gases, can be vented to the atmosphere without producing an objectionable plume.

Waste halides which can be cleansed from the waste gas stream by the process of the present invention include the halides of titanium, aluminum, vanadium, silicon, tin, magnesium, zinc, antimony, sulfur, phosphorus and ammonium. The amount of waste halide impurities which can be present in the waste gas stream is from trace amounts to about 10 weight percent based on the total weight of the waste gas stream. Aqueous acids which can be used in the process of the present invention include HCl, $HNO_3$, HBr, HI, and HF. Best results are obtained when the acid contains the same halide anion as the impurity that is to be removed from the waste gas stream. For instance, if one wanted to remove a chloride impurity, then one would choose HCl because both the impurity and the acid contain the chlorine anion. The most preferred acid is HCl because when it is neutralized with a base (e.g., NaOH or Ca(OH)$_2$), it forms chloride salts (e.g., NaCl or $CaCl_2$) which are more easily disposable than the salts formed by the other acids.

Aqueous halide salts which can be used in the process of the present invention include halide salts of calcium, sodium, ammonium, lithium, barium, and iron. Best results are obtained when the salt contains the same halide group as the impurity that is to be cleansed from the waste gas stream. The most preferred salt is sodium chloride because of its economy and disposability.

The concentration of acid required is dependent upon the type of acid used and the temperature. The process is operated at low pressure (e.g., about 4 psig). Under normal operating conditions for the production of waste halides, the initial temperature of the waste gas stream is about −30° to 20° C. In the present invention, the concentration and initial temperature of the mist must be adjusted so that the combined waste gas stream and mist is about −5° to 70° C., and the water vapor pressure of the mist both before and after the mist is contacted with the waste gas stream is about 0.05–5.0 mm Hg. Water vapor pressure for each mist varies with concentration and temperature. Specific concentrations and temperatures to obtain the vapor pressures of the aqueous acid or aqueous waste halide mists used in the practice of the present invention can be determined by referring to Perry et al., *Chemical Engineers' Handbook*, McGraw Hill, New York, N.Y. (1963), pages 3–60 to 3–64 and 3–227 and 3–228, and Chu et al., *Vapor-Liquid Equilibrium Data*, J. W. Edwards, Ann Arbor, Michigan (1956). The preferred water vapor pressure of the mist is as low as possible because this minimizes the vapor phase hydrolysis of the metal halides.

The preferred temperatures of the waste gas stream is about −15° to −30° C. because at these temperatures most of the waste halides are condensed out and the waste gas stream contains the least amount of waste halides. This means less mist is required to scrub the waste halides.

The following examples are illustrative of the invention. All parts, percentages, and proportions are by weight unless otherwise indicated.

EXAMPLE 1

Dried gas at 15° C., composed essentially of nitrogen, and about 2.6 weight percent $TiCl_4$ is contacted with 29 weight percent aqueous HCl mist containing 1.9 weight percent titanium in a 2.5 inch (outside diameter) glass baffle column which is 11 inches in length and contains 20 trays. The HCl is introduced into the column through a ¼ inch diameter glass tee which is located at the top of the column. The temperature of the HCl mist is 18° C. and it is essentially kept constant at this temperature while the gas is contacted with it. Vapor pressure of the HCl solution is 5.0 mm Hg and the ratio of the surface area of the HCl mist to the weight of $TiCl_4$ is about 2.6 m² surface area per gram. HCl and gas are circulated cocurrently through the column at rates of 108 gallons per hour and 32 standard cubic feet per hour, respectively. After the gas is discharged from the bottom of the column, it is scrubbed with water to remove any HCl present. Then the gas is vented to the atmosphere.

As the gas is vented to the atmosphere, essentially no fumes are visible. Analysis of the acid shows that the soluble titanium content has increased to 2.2 weight percent which means that the HCl absorbed $TiCl_4$ from the gas containing $TiCl_4$. Essentially all of the $TiCl_4$ is absorbed since the gas vented to the atmosphere does not appear as a white cloud.

EXAMPLES 2–11

Example 1 is repeated under the conditions listed in Table 1. HCl mist was used in all cases.

TABLE 1

| Example | HCl Conditions | | | Wt. % Soluble Ti Initially In the HCl | Wt. % Soluble Ti in HCl After Contact With the Gas | Did the gas fume when vented to the atmosphere after contact with HCl? |
| --- | --- | --- | --- | --- | --- | --- |
| | Wt. % HCl | Temp. | Vapor Pressure (mm Hg) | | | |
| 2 | 24 | −3° C. | 1.6 | 0.20 | 0.25 | No |

TABLE 1-continued

| Example | HCl Conditions | | | Wt. % Soluble Ti Initially In the HCl | Wt. % Soluble Ti in HCl After Contact With the Gas | Did the gas fume when vented to the atmosphere after contact with HCl? |
| --- | --- | --- | --- | --- | --- | --- |
| | Wt. % HCl | Temp. | Vapor Pressure (mm Hg) | | | |
| 3 | 29 | 9° C. | 2.7 | 2.0 | 2.2 | No |
| 4 | 24 | 3° C. | 2.8 | 0.08 | 0.19 | No |
| 5 | 30 | 12° C. | 3.0 | 0 | 0.02 | No |
| 6 | 27 | 9° C. | 3.2 | 2.01 | 2.18 | No |
| 7 | 34 | 18° C. | 3.2 | 1.93 | 2.18 | No |
| 8 | 25 | 8° C. | 3.4 | 0.08 | 0.20 | No |
| 9 | 27 | 11° C. | 3.6 | 0.02 | 0.08 | No |
| 10 | 29 | 25° C. | 7.6 | 2.18 | 2.20 | Yes |
| 11 | 24 | 25° C. | 11 | 2.18 | 2.20 | Yes |

In Examples 10 and 11, the gas fumes when vented to the atmosphere, which shows that TiCl$_4$ is not effectively removed from the gas when the vapor pressure of the acid is too high.

EXAMPLES 12-16

If the procedure of Example 1 is repeated using the mists and conditions listed in Table 2, the indicated results would be obtained.

TABLE 2

| Example | Mist Conditions | | | | Wt. % Ti Initially In the Mist | Wt. % Ti and In the Mist After Contact With Gas | Did the gas fume when vented to the atmosphere after contact with the mist? |
| --- | --- | --- | --- | --- | --- | --- | --- |
| | Mist | Wt. % | Temp. | Vapor Pressure (mm Hg) | | | |
| 12 | HNO$_3$ | 70 | 23° C. | 4.94 | 0 | 0.11 | No |
| 13 | FeCl$_3$ | 30 | 0° C. | 4.1 | 0 | 0.12 | No |
| 14 | FeCl$_3$ | 30 | 23° C. | 19.2 | 0 | 0.06 | Yes |
| 15 | NaCl | 30 | 0° C. | 4.1 | 0 | 0.12 | No |
| 16 | NaCl | 30 | 23° C. | 19.4 | 0 | 0.06 | Yes |

In Examples 14 and 16, the gas would fume when vented to the atmosphere because the TiCl$_4$ would not be effectively removed from the gas when the vapor pressure of the mist is above the limits set out for this invention.

I claim:

1. In a process of treating a mixture of halide vapors to remove the vaporous halides of titanium, aluminum, vanadium, silicon, tin, magnesium, zinc, antimony, sulfur, phosphorus, and ammonium and separating said vaporous halides from acid halides in a waste gas stream followed by the waste gas stream the scrubbing of the improvement comprising the removal of said vaporous halides without the formation of particulates from said vaporous halides during separation by A. generating an absorptive aqueous mist containing water in which is dissolved HCl, HNO$_3$, HBr, HF, HI, or one or more halide salts of calcium, sodium, ammonia, lithium, barium, and iron;

B. maintaining the temperature of the combined waste gas streams and aqueous mist at a temperature of from −5° C. to 70° C.;

C. maintaining the water vapor pressure of the absorptive aqueous mist at a vapor pressure of from 0.05–5.0 mm Hg prior to contact with the waste gas stream;

D. controlling the particle size of the aqueous absorptive mist so that the ratio of the surface area of the absorptive aqueous mist to the weight of the waste halide to be removed is at least 2 square meters surface area of the absorptive aqueous mist per gram of waste halide present in the gas stream;

E. contacting the gas stream containing the vaporous halide with the absorptive aqueous mist to absorb said vaporous halide; and F. separating the gas stream from the aqueous absorptive mist.

2. The process of claim 1 wherein the ratio between the surface area of the aqueous mist to the weight of waste halide is about 12–16.

3. The process of claim 2 wherein the HCl is dissolved in the aqueous mist.

4. The process of claim 2 wherein sodium chloride is dissolved in the aqueous mist.

5. The process of claim 2 wherein the waste halide is titanium tetrachloride.

6. The process of claim 5 wherein HCl is dissolved in the aqueous mist.

7. The process of claim 5 wherein sodium chloride is dissolved in the aqueous mist.

8. The process claim 2 wherein the waste halide impurity is silicon tetrachloride.

9. The process of claim 8 wherein HCl is dissolved in the aqueous mist.

10. The process of claim 8 wherein sodium chloride is dissolved in the aqueous mist.

* * * * *